(No Model.)

W. B. LINDSAY, W. E. TONNER & A. LOWMILLER.
FILTER.

No. 536,536. Patented Mar. 26, 1895.

Witnesses

Inventors
William B. Lindsay
William E. Tonner
Alpheus Lowmiller
By R.S. & A.P. Lacey
Attorneys

UNITED STATES PATENT OFFICE.

WILLIAM B. LINDSAY, WILLIAM E. TONNER, AND ALPHEUS LOWMILLER, OF STEUBENVILLE, OHIO.

FILTER.

SPECIFICATION forming part of Letters Patent No. 536,536, dated March 26, 1895.

Application filed March 29, 1894. Serial No. 505,611. (No model.)

*To all whom it may concern:*

Be it known that we, WILLIAM B. LINDSAY, WILLIAM E. TONNER, and ALPHEUS LOWMILLER, citizens of the United States, residing at Steubenville, in the county of Jefferson, State of Ohio, have invented certain new and useful Improvements in Filters; and we do hereby declare the following to be a full, clear, and exact description of the invention, such as will enable others skilled in the art to which it appertains to make and use the same.

This invention relates generally to filters and particularly to that class thereof known as porous wall filters in which the water to be filtered is passed through a porous partition or septum and received into a clear white chamber.

The object of our present invention is to provide certain improvements in this class of filters whereby the porous partition can be rapidly and thoroughly cleaned whenever it becomes necessary.

Heretofore brushes of wire and fabric have been employed to scrape the sides and bottoms of porous vessels to clean them but we have found that they do not thoroughly cleanse the same.

Our invention therefore has for its object to avoid this fault and provide a cleaner which will remove all precipitates and accumulations upon the bottom, and with this object in view our invention consists broadly of a revoluble stone rubber or scraper which rests upon the porous bottom of a vessel, and capable of revolution thereon whereby the face of the porous septum is rubbed smooth and thoroughly cleaned.

Our invention consists also in the manner of arranging this rubber and the means for operating the same.

Figure 1:
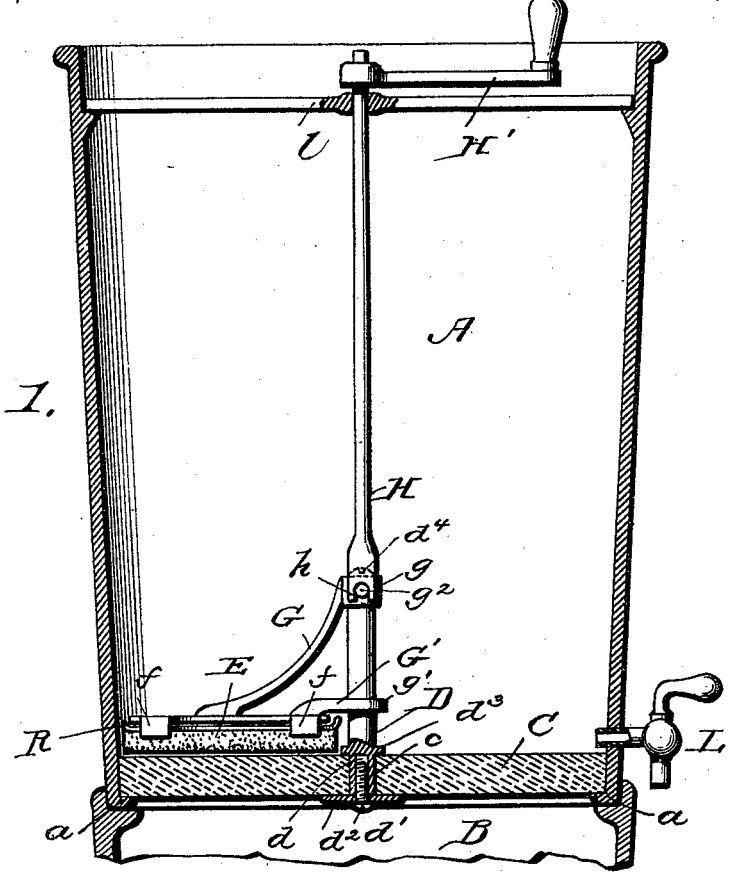
Figure 2:
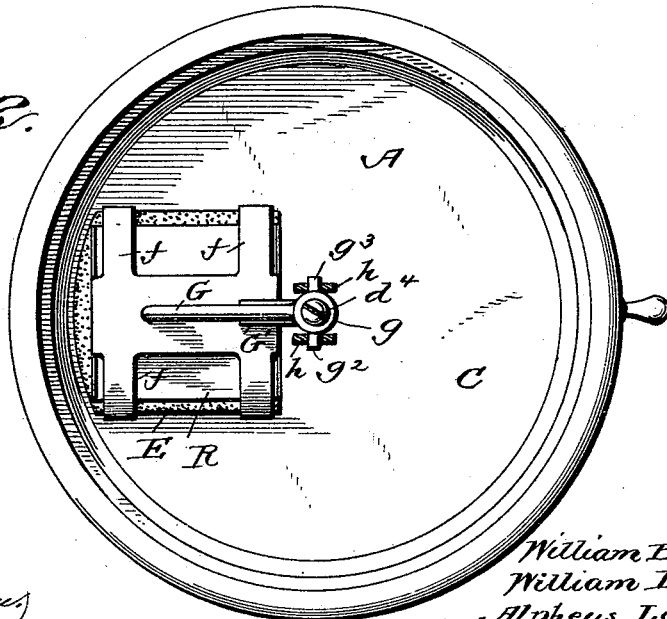

In the drawings hereto annexed, Figure 1 is a vertical sectional view of our improved filter. Fig. 2 is a top plan view showing the rubber and operating mechanism.

In carrying out our invention we employ a filtering chamber or vessel A, and a receiving vessel B for receiving the filtered water after it has passed through the porous bottom C of the vessel A. The sides of the vessel or chamber A may be of any suitable material and the bottom rests tightly upon a flange or rim $a$ at the lower end of said vessel. The receiving vessel B has its upper edge rabbeted in order to receive the bottom edges of the vessel A. The bottom C of the vessel A is made of any suitable porous stone or composition but in practice we prefer to use a disk of Tripoli stone as we have found that particularly well adapted for such purposes. This bottom is cemented in the sides to make a perfectly tight joint. This stone bottom is formed with a central aperture $c$ through which is passed the lower end of a short vertical post D, the lower end of said post having a threaded aperture $d$ into which works the screw $d'$ by means of which the post is secured within the stone bottom, a washer $d^2$ being interposed between the screw head and bottom and a collar $d^3$ is formed upon the post to bear against the upper face of the bottom and make a tight joint between the said post and bottom.

The cleaning rubber grinder or scraper E is made of stone, and may be of natural or artificial stone as desired, but we prefer to use the natural stone, as it does not become foul like a composition one and the cleaning process is more complete than when a composite one is used. The rubber, or scraper, is adapted to rest upon the stone bottom and be revolved around the central post and to provide for such revolution we provide a strip F which rests upon the block of stone E and has clamping arms $f$ to clasp and hold the said block.

Extending upwardly from the strip F are the arms G and G' having collars $g$ $g'$, respectively, which fit around the central post D. A screw $d^4$ with a large head is inserted in the upper end of the post D and bears upon the upper collar $g$ to hold the same in place. This upper collar $g$ is also provided with laterally projecting studs $g^2$ $g^3$ which are engaged by the slotted members $h$ of an operating shaft H, said shaft being journaled in a spider $l$ supported near the top of the vessel A, and provided with a handle H'.

Between the block of stone E and strip F we interpose a spring plate R to keep the stone always in contact with the bottom.

Now in operation water is poured into the vessel A and slowly passes through the porous partition into the vessel B. In doing so a certain amount of sediment is deposited upon the face of the bottom C. By continued use this deposit becomes quite thick and it becomes necessary to remove it. To do this we revolve the handle H' which revolves the stone rubber or scraper which not only cleans off all the sediments but polishes down the face of the stone to make it perfectly pure, smooth and clean. Fiber brushes cannot accomplish this as they wear down the face of the stone removing the sediment superficially leaving the surface rough and imperfect. Our device, however, smoothes down and removes the impregnated portion of the stone leaving the surface in a condition so that impediments do not adhere, but are easily removed rendering the stone more smooth. After the cleaning process has been accomplished the vessel is flushed and the water drawn off through a cock L arranged at the bottom of the same.

Having thus described our invention, what we claim, and desire to secure by Letters Patent, is—

1. In a filter of the class described, the combination with a vessel having a porous stone bottom, of a central post a stone rubber or scraper, arms connecting the stone rubber with the post and means for revolving the same about said post, substantially as shown and described.

2. In a filter of the class described, the combination with the vessel having a porous bottom of a central post, a rubber resting upon the bottom, the arm connecting the post and rubber, and the operating shaft connected with said arms, to revolve the rubber, substantially as shown and described.

3. In a filter of the class described the combination with a vessel having a porous bottom said bottom having a central aperture of the central post passed therethrough and having a flange or collar, the binding screw, the rubber or scraper, the arms connecting the rubber and post and means for operating said rubber, substantially as shown and described.

4. In a filter of the class described the combination with a vessel having a porous bottom of a central post, the rubbing block, the strip having arms provided with collars, the upper collar having studs, the operating handle and shaft, the lower end of said shaft being slotted, substantially as and for the purpose described.

5. In a filter of the class described the combination with a vessel having a porous bottom of a central post, a rotary rubber or scraper, the arms journaled upon the posts, a strip to which said arms are connected and a spring interposed between said strip and rubber, substantially as and for the purpose described.

In testimony whereof we affix our signatures in presence of two witnesses.

WILLIAM B. LINDSAY.
WILLIAM E. TONNER.
ALPHEUS LOWMILLER.

Witnesses:
J. W. EVANS,
H. H. FICKE.